March 26, 1940.    E. REIFSCHNEIDER    2,194,482
BEET PULLER
Filed Feb. 1, 1937    2 Sheets-Sheet 1
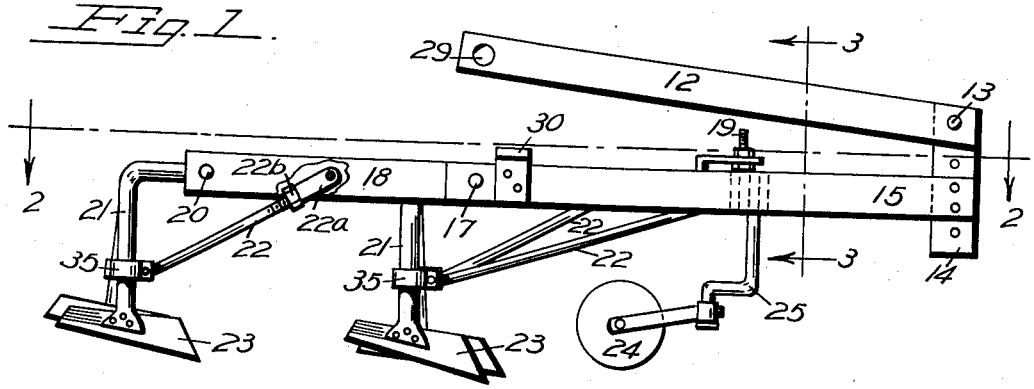
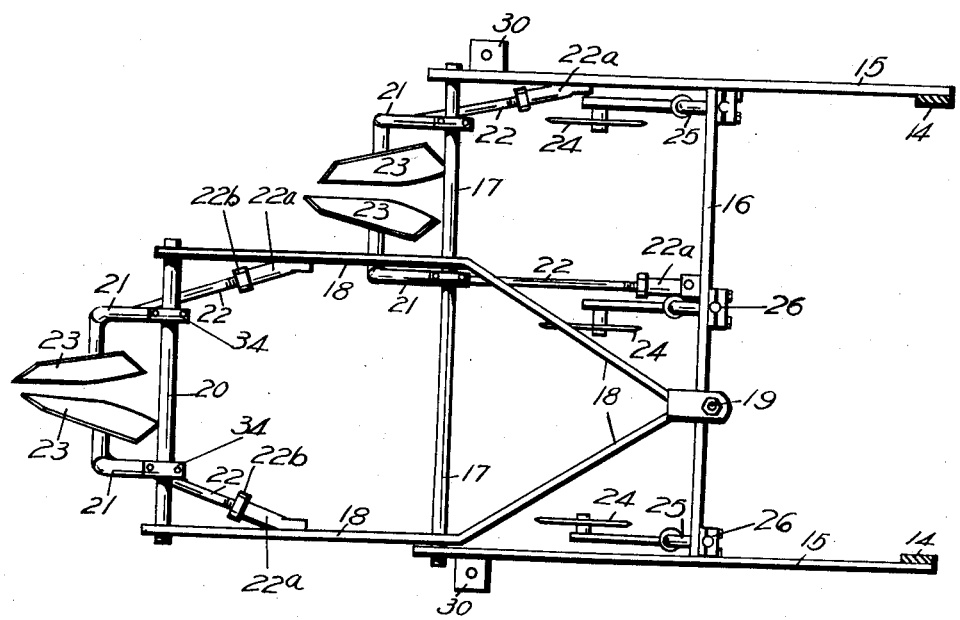
INVENTOR.
EDWARD REIFSCHNEIDER
BY
ATTORNEY.

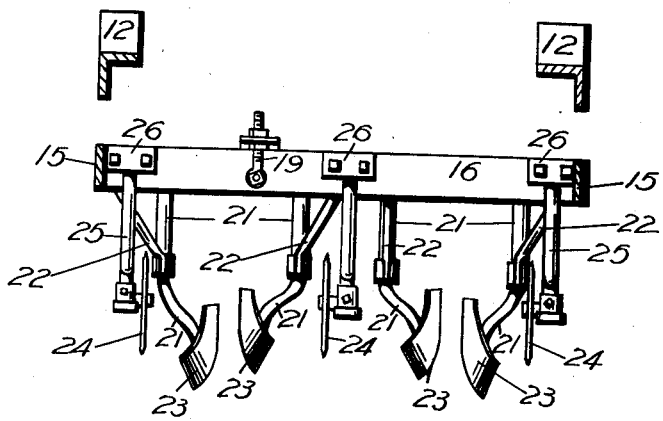
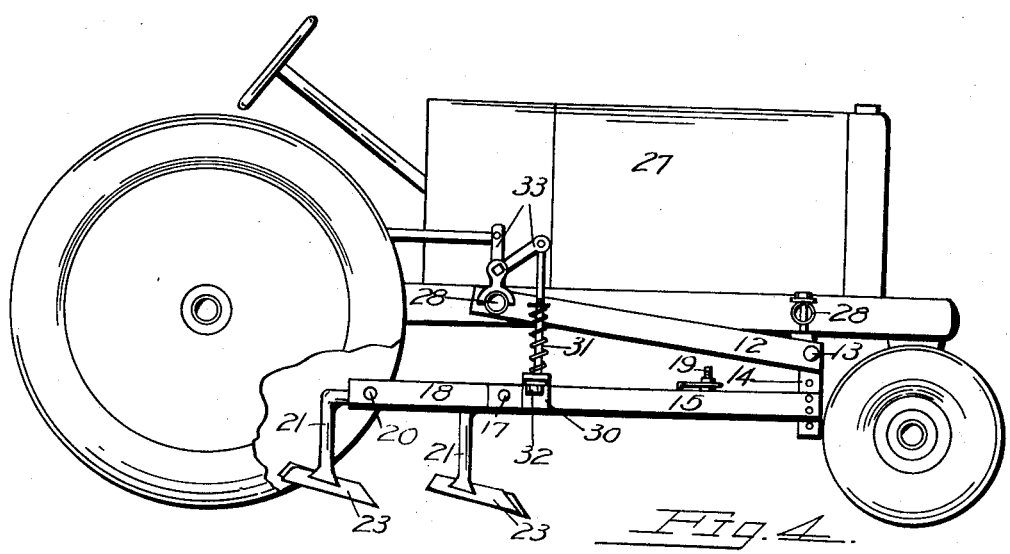
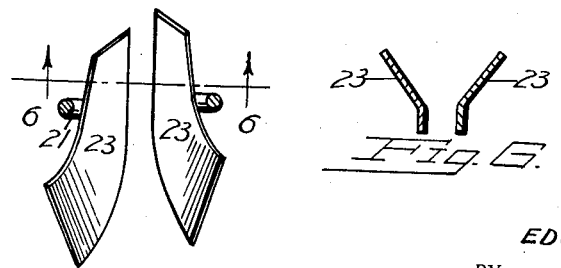

Patented Mar. 26, 1940

2,194,482

UNITED STATES PATENT OFFICE 2,194,482

BEET PULLER

Edward Reifschneider, Kelim, Colo.

Application February 1, 1937, Serial No. 123,445

8 Claims. (Cl. 55—106)

This invention relates to improvements in sugar beet pullers.

An object of the invention is to provide a beet puller or lifter that can be readily attached beneath a row-crop type tractor.

Another object is the provision of a sugar beet puller that will loosen and lift the beets to the surface of the ground without damage to the beets.

A further object is to construct a sugar beet puller that will windrow the beets as they are lifted to the surface.

A still further object is to furnish a beet puller that will not clog with the beets.

Other objects and advantages reside in details of design and construction that will be more fully disclosed in the following description and in the drawings, wherein like parts have been similarly designated and in which:

Figure 1 is a side elevation of a beet puller embodying the invention;

Figure 2 is a plan view partly in section, taken on line 2—2 of Figure 1;

Figure 3 is a vertical section on line 3—3 of Figure 1;

Figure 4 is a side elevation showing the improved beet puller attached to a typical row-crop type tractor;

Figure 5 is an enlarged detail view of the lifting plows; and

Figure 6 is a sectional view on line 6—6 of Figure 5.

In the drawings, reference character 12 denotes a pair of driving angle irons that are pivoted at 13 to connecting bars 14 that are bolted to frame members 15. A plurality of bolt holes are provided in bars 14 for selective location of the frame members 15 thereon. A transverse bar 16 connects the frame members and a shaft 17 is carried by the members toward their rear ends. A tilting frame 18 is pivoted on the shaft and held in a selected pivotal position by a bolt 19 on the transverse bar 16. A short shaft 20 is mounted on the tilting frame 18 toward the rear. On each shaft is pivotally mounted a pair of plow beams 21 that extend rearwardly and downwardly from their respective shaft mountings. An adjustable tie-rod or brace 22 connects each individual plow beam with a frame member to hold the respective beams in selected pivotal positions.

Each beam carries a lifter-type plow share 23 of a special shape for the work to be done as clearly shown in Figures 5 and 6. Three rolling colters or disks 24 are mounted forward of the plows on adjustable standards 25 that are clamped at 26 to the transverse member 16.

The entire assembly is adapted to be attached beneath a row-crop type tractor 27 that is usually provided with three wheels as illustrated in Figure 4. Extending laterally on both sides from the main frame of this type of tractor are tubular bars 28. The front ends of the angle irons 12 are bolted to the forward tubular bars 28 and apertures 29 are provided in the rear ends of the angle irons to pass over the rear tubular bars 28. An apertured suspending bracket 30 is attached to each side of the frame members 15 and a lifting rod 31 passes through each of the brackets and carries a nut 32 to prevent withdrawal of the rod therefrom. The upper ends of the lifting rods are attached to a lifting mechanism 33 on the tractor.

Operation

In use the improved sugar beet puller is attached to a tractor as described and illustrated and the frame 15 is capable of pivotal movement about pivot 13 as an axis. The lifting mechanism 33 may be power operated from the tractor or it could be a hand-operated mechanism. This serves to raise the plows and lower them into the ground, and the rods 31 and their nuts 32 limit the depth to which the plows cut into the soil, the tendency being for them to be urged downwardly by their friction with the soil as the tractor draws them forward.

The plow-beams 21 may be adjusted along their respective shaft mountings for correct row-spacing and proper cooperative lifting spacing between the individual members of each pair, and then locked in their selected positions by beam-clamps 34. Tie-rods or braces 22 may be lengthened or shortened by removing their threaded socket-anchors 22a from the frame members and screwing them outwardly or inwardly on the rods. The desired length is retained by lock-nuts 22b. The socket-anchors are then replaced on the frame members, as by bolting, the other ends of the rods being pivotally attached to the respective plow-beams by means of collars 35.

Preferably, the inner plow of each pair is adjusted to a position that is somewhat to the rear of the other plow of the pair. This arrangement throws the beets outwardly as they are loosened and raised by the action of the plows.

The particular shape and spacing of the pairs of plows is effective for lifting the beets along a row, without touching or damaging them and then tipping them outwardly into windrows with their tops in the outward direction where they can be conveniently reached for the next step in their harvesting.

The rolling colters or disks 24 are spaced to run midway between the planted rows to cut off overlapping leaves or other growth so that the plows, each pair of which straddles a beet row, may be fully effective for the work to be done by them.

It will be clearly seen that the improved beet puller is convenient and requires very little space for storage and in use it does not extend beyond the limits of the tractor itself. This latter feature facilitates use in the field, making it easy to turn and to reach the ends of the rows.

It will be further noted that the plow beams extend to the rear of their respective carrying shafts so that there is no obstruction above the plows to clog the beets as they are raised between them. This effects a smooth, uninterrupted flow of beets between the plows, as they are lifted from the soil.

The lifting mechanism 33 together with rods 31 may be used to limit the working depth of the plows which will vary according to the type and condition of the soil and the size and condition of the beets to be pulled.

What I claim and desire to secure by Letters Patent is:

1. In combination with a tractor, a beet puller comprising a frame pivoted to the tractor, mechanism for controlling movement of the frame, a pair of co-acting lifting-plows pivoted to the frame beneath the tractor, and means for holding the plows in a selected position.

2. In combination with a tractor, a beet puller comprising a frame pivoted beneath the tractor, another frame pivoted to the first-mentioned frame, a mechanism for controlling the pivotal movement of the first frame, means for holding the second frame in a selected position, pairs of co-acting lifting-plows pivoted to the respective frames, and a tie-rod separately determining the position of each plow.

3. In combination with a tractor, a beet puller comprising a frame pivoted beneath the tractor, a mechanism controlling movement of the frame, a pair of plow beams pivoted on the frame and extending rearwardly therefrom, co-acting lifting-plows on the respective beams, a second frame on the first-mentioned frame and extending rearwardly therefrom, a pair of plow beams pivoted on the second frame and extending rearwardly therefrom, lifting-plows on the second plow beams respectively, and means for holding the plows in selected relative positions.

4. In combination with a tractor, a beet puller comrising a frame beneath the tractor and pivoted thereto, means for controlling the pivotal movement of the frame, a pair of co-acting lifting-plows on the frame, and a second pair of co-acting lifting-plows on the frame to the rear of the first said plows.

5. In combination with a tractor, a beet puller comprising a frame beneath the tractor and pivoted thereto, means for controlling the pivotal movement of the frame, a pair of co-acting lifting-plows on the frame, and a second pair of co-acting lifting-plows on the frame to the rear of the first said plows, one plow of each pair being rearward of its co-acting plow.

6. In combination with a tractor, a beet puller comprising a frame beneath the tractor and pivoted thereto, means for controlling the pivotal movement of the frame, a pair of co-acting lifting-plows on the frame, a second pair of co-acting lifting-plows on the frame to the rear of the first-mentioned plows, and colters on the frame ahead of the plows.

7. A beet puller comprising in combination with a tractor, a pivoted frame positioned beneath the tractor in connection therewith, a pair of co-acting lifting plows positioned beneath the tractor, and a plow-beam for each plow connected with the frame at a place beneath the tractor and forward of the normal position of the plows.

8. A beet puller comprising in combination with a tractor, a frame positioned beneath the tractor and connected thereto, a pair of coacting lifting plows beneath the tractor, a plow-beam for each plow connected to the frame at a place beneath the tractor and forward of the normal position of the plows, another pair of lifting plows positioned beneath the tractor and rearward of the first said pair of plows, and a plow-beam for each of the second said plows connected with the frame at a place beneath the tractor and forward of the normal position of the second said pair of plows.

EDWARD REIFSCHNEIDER.